United States Patent [19]

Faghri

[11] Patent Number: 5,000,252
[45] Date of Patent: Mar. 19, 1991

[54] THERMAL ENERGY STORAGE SYSTEM
[75] Inventor: Amir Faghri, Dayton, Ohio
[73] Assignee: Wright State University, Dayton, Ohio
[21] Appl. No.: 483,737
[22] Filed: Feb. 22, 1990
[51] Int. Cl.$^5$ .................. F28D 15/02; F28D 20/00
[52] U.S. Cl. .......................... 165/10; 165/41; 165/104.11; 165/104.14; 165/902
[58] Field of Search .............. 165/47, 902, 104.11, 165/10 A, 104.14, 41

[56] References Cited

U.S. PATENT DOCUMENTS

| 3,038,074 | 6/1962 | Scherbatskoy | 165/902 |
| 3,137,184 | 6/1964 | Meyers | 165/902 |
| 4,131,158 | 12/1978 | Abhat et al. | 165/10 |
| 4,362,207 | 12/1982 | Casali et al. | 165/10 |
| 4,611,474 | 9/1986 | Musinski | 165/104.21 |
| 4,671,349 | 6/1987 | Wolk | 165/902 |
| 4,673,030 | 6/1987 | Basiulis | 165/104.11 |
| 4,755,350 | 7/1988 | Kennel | 376/321 |
| 4,768,345 | 9/1988 | Kardas | 126/400 |
| 4,809,771 | 3/1989 | Kennel et al. | 165/10 |

*Primary Examiner*—Albert W. Davis, Jr.
*Attorney, Agent, or Firm*—Killworth, Gottman, Hagan & Schaeff

[57] ABSTRACT

A thermal management system includes micro heat pipes extending radially outward from a heat sink which surrounds a heat source, rapidly conducting thermal energy away from the heat source, improving significantly the storage of thermal energy in the heat sink, and providing a means for later dissipating thermal energy from the heat sink to an ultimate heat sink over a period of time.

31 Claims, 3 Drawing Sheets

THERMAL ENERGY STORAGE SYSTEM

BACKGROUND OF THE INVENTION

This invention relates to the storage and dissipation of heat from systems having large thermal management problems, in particular, to the storage and dissipation of energy from high power, space-based systems applications, such as microwave tubes used in weapons systems. The invention also relates to the storage and dissipation of heat from high power components of ground-based facilities, such as fuel rods in nuclear power plants.

In the operation of high energy space-based devices, thermal energy, typically generated during a burst power mode, must be dissipated and may be conveyed to an ultimate heat sink, such as outer space. It has been proposed to use a phase-change material, such as lithium salts, particularly lithium hydride, as a heat sink to remove and store excess heat during the burst power mode Thereafter, the heat may be dissipated from the heat sink over a longer period of time to an ultimate heat sink. Phase-change materials have a high heat of fusion which enables the storage of significant amounts of thermal energy as such materials change from solid to liquid Phase. They later resolidify as the thermal energy is dissipated to an ultimate heat sink.

While lithium hydride has high thermal energy storage capacity, it has very low thermal conductivity. Problems exist, therefore, in conducting thermal energy into phase-change materials for storage. Further, because of low thermal conductivity, heat sink surfaces closest to heat sources develop excessive temperatures.

In an attempt to use the desirable thermal storage capacity of phase-change materials, solutions to management problems presented by large or high-power systems have been proposed, wherein phase-change materials, are encapsulated in shells, preferably cylinders or spheres, which are then submerged in baths of high thermal conductivity materials. Typically in applications such as described above, the heat sink is designed to surround the heat source. While submerging shells of phase-change materials in such baths improves the overall thermal conductivity of the heat sink and facilitates the storage of energy, problems remain with excessive temperatures occurring on surfaces of the heat sinks.

One approach to reduce the excessive surface temperatures is to further increase the overall thermal conductivity of the heat sink so that the thermal management systems may even more effectively conduct the heat away from the source. Conventional means for increasing system thermal conductivity, such as increasing the size or amount of thermally conductive bath materials, are unacceptable due to size and weight constraints on space-based systems and size limitations on ground-based systems applications.

Another approach is shown by Kennel, U.S. Pat. No. 4,755,350 where the heat source surrounds the heat sink of a thermal management system. A phase-change material is used to absorb heat from thermionic emitter electrodes for space-based weapons applications. A single conventional heat pipe located along the central axis of the phase-change material carries away waste heat stored in the phase-change material. This approach, however, is limited to applications where phase-change materials are enclosed or surrounded by heat sources, and the size of the heat sink is limited by the physical dimensions of the heat source present in a particular application. Moreover, in some applications, such as the space and ground based applications described above, a single conventional high capacity heat pipe such as shown by Kennel is not capable of transferring thermal energy from the source at desired rates.

There remains, therefore, a need to provide more effective, low thermal resistance heat sinks wherein thermal energy from heat sources may initially be stored in phase-change materials and later dissipated to an ultimate heat sink.

SUMMARY OF THE INVENTION

The present invention meets that need by providing a thermal energy management system which surrounds a source of thermal energy with a heat sink comprised of a plurality of micro or semi-micro heat pipes positioned radially in and through the heat sink. The heat sink is further comprised of phase-change material which is encapsulated in shells, preferably cylindrical or spherical in shape, which are immersed in a bath of thermally conductive material. Both the thermally conductive bath material and the micro heat pipes direct thermal energy from the heat source into the heat sink where it may be stored in the phase-change material. The micro heat pipes further provide a means for the energy to be dissipated outward from the container over a period of time to an ultimate heat sink. Thus, the system is designed to store thermal energy rapidly in a heat sink during the burst power mode of a heat source, and later dissipate the thermal energy from phase-change material in the heat sink to an ultimate heat sink.

The radial orientation of micro heat pipes in the heat sink provides a plurality of paths of low thermal resistance which effectively conduct thermal energy away from the heat source, thereby reducing excessive temperatures at the container surfaces near the heat source. While some thermal energy may be conducted through the micro heat pipes to the ultimate heat sink during the burst power mode, the greater quantity of thermal energy is conducted by the micro heat pipes and container surfaces into the heat sink where it is effectively conveyed by the thermally conductive bath to the phase-change material. Problems presented by the low thermal conductivity of heat sink material are thereby avoided with this system and do not impede the rapid distribution of thermal energy away from a centrally located heat source.

Depending on the choice of heat pipe and phase change materials the present invention may be used to solve thermal management problems throughout the entire temperature range at which heat Pipes operate. The high power applications discussed herein are representative and illustrate the function of the present invention in extreme conditions. It is noted, however, that the precise choice of materials and working fluid for the heat pipe will vary with the operating temperatures and thermal loads of each application, as will the choice of container and phase-change materials used for the heat sink. There are over 100 working fluids and more than 50 phase change materials which may be used, depending on the application. As well, the container surrounding the heat source may be cylindrical, spherical, rectangular, square or other shapes, as needed, without departing from the scope of the present invention. Further, the micro heat pipes, which preferably extend outward from the heat sink in a generally radial direction relative to the heat source, may, in some instances, be oriented outward in other patterns, without departing from the scope of the invention, and still provide for rapid efficient transmission of thermal energy to storage and dissipation. The components of the present invention are joined by means known in the art, such as press fitting and, if needed, TIG welding and brazing.

Annular heat pipes are known which contain an inner core of phase-change material in the end nearest the source of thermal energy to enhance operation of the heat pipes and further improve thermal energy transfer and storage capacity of the system.

In the preferred embodiment of the thermal energy management system for high power space-based applications, the container is comprised of inner and outer walls which define an annular volume wherein spheres of lithium hydride phase-change material are immersed in a sodium potassium bath. A plurality of heat pipes, preferably micro or semi-micro annular heat pipes, are extended outward from the surface of the container inner wall in a generally radial direction. The heat pipes preferably extend beyond the outer wall of the container to communicate with an ultimate heat sink. The ultimate heat sink may be outer space or, alternatively a radiator. The micro or semi-micro annular heat pipes, themselves made of stainless steel, further, preferably use sodium as a working fluid in high temperature applications. The inner core of such annular heat pipes preferably contains lithium hydride. Stainless steel, which forms the walls of the heat pipe and covers the inner core is in contact with the working fluid, as is wick material which covers the inner surfaces of the heat pipe and outer surfaces of the inner core to provide for capillary flow of the working fluid.

While in other applications at other temperatures and thermal loads, the precise choice of materials for the heat pipes and heat sink may vary from the above examples, such application-specific deviations may be made without departing from the scope of the present invention wherein the placement of radially directed heat pipes in and through the heat sink solves the problems and provides the advantages described above.

DETAILED DESCRIPTION OF THE PREFERRED EMBODIMENT

Figure 1:
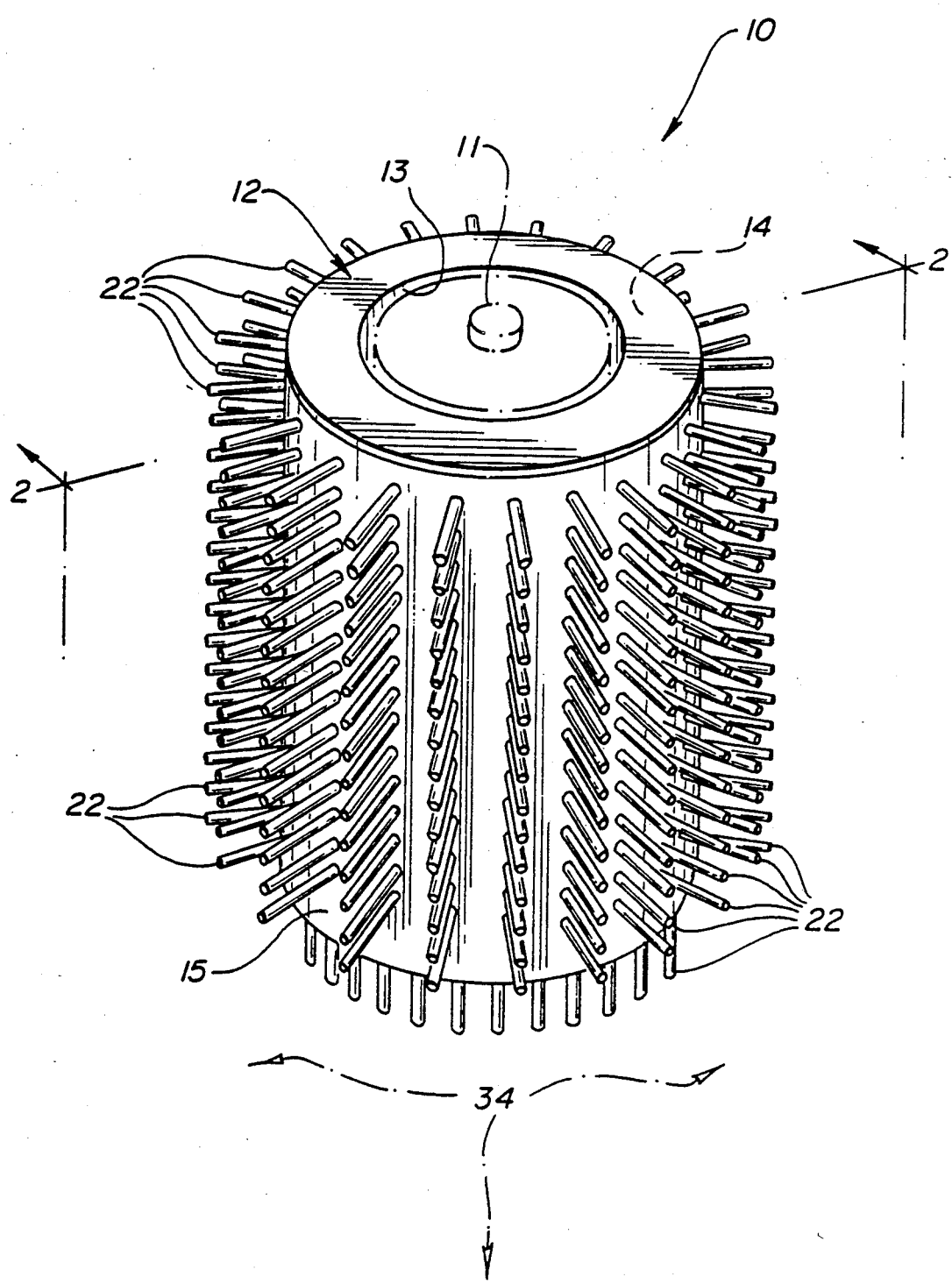
FIG. 1 is a perspective view of the preferred embodiment of the thermal energy management system adapted for use with a centrally located heat source.
Figure 2:
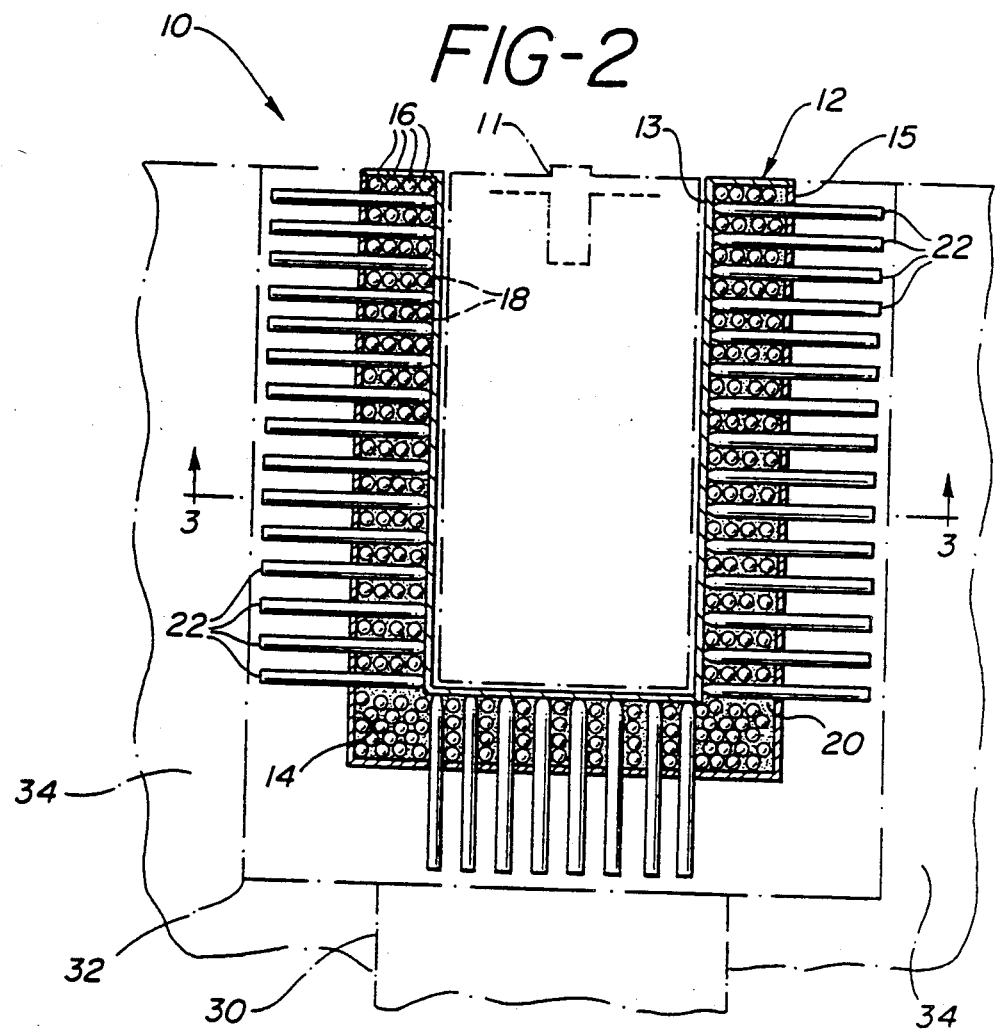
FIG. 2 is a cross-section of FIG. 1 at line 2—2.
Figure 3:
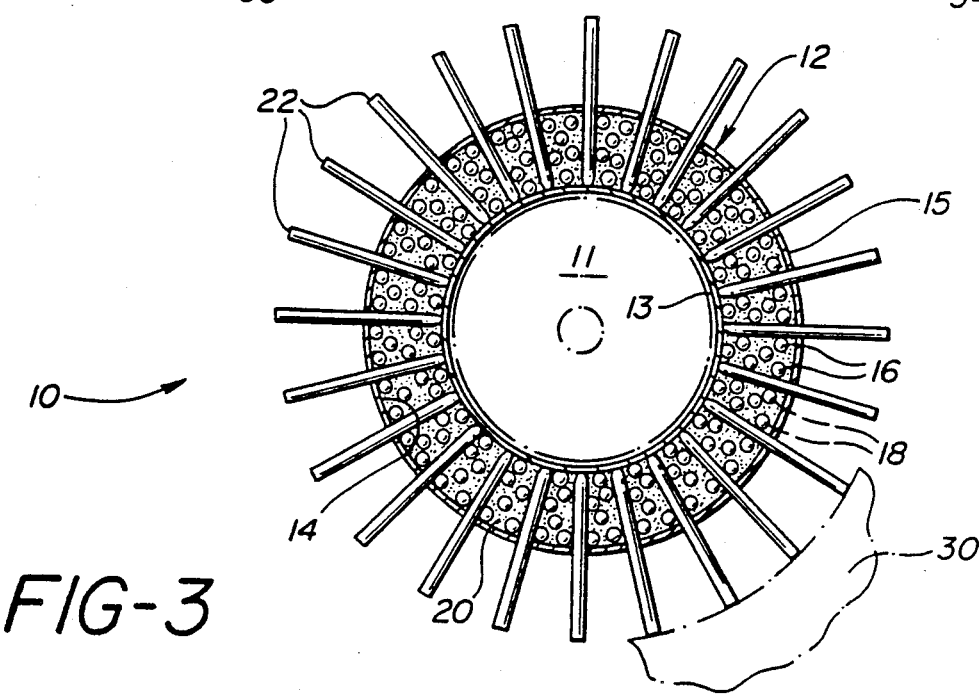
FIG. 3 is a cross-section of FIG. 2 at line 3—3.

Referring to FIG. 1, the thermal energy management system 10 of the present invention is shown in the preferred embodiment for applications having a centrally located heat source 11, shown in phantom. As seen in FIGS. 2 and 3, system 10 comprises a container 12 which may surround a heat source 11. Container 12 is comprised of an inner wall 13 and outer wall 15 which contain heat sink 14. A plurality of heat pipes 22 are oriented radially outward through container 12 to provide a plurality of paths of low thermal resistance into and through heat sink 14. Heat sink 14 is preferably comprised of a phase-change material, which may vary with the application. Heat sink 14 is comprised of shells 16 filled with phase-change material 18. Shells 16 are immersed in a bath of thermally conductive material 20, which provides a means to conduct thermal energy into and out of shells 16 from the surfaces of container 12 and heat pipes 22. The outer ends of heat pipes 22 may communicate with ultimate heat sink 34, a second container 32 (shown in FIG. 2), or alternately, with a radiator 30 (as shown in FIGS. 2 and 3), or other dissipative devices (not shown). The outer ends of heat pipes 22 and the outer surfaces of container 12 may themselves act as radiators to an ultimate heat sink such as outer space, and may, further, have their outer surfaces treated to this end.

Figure 4:
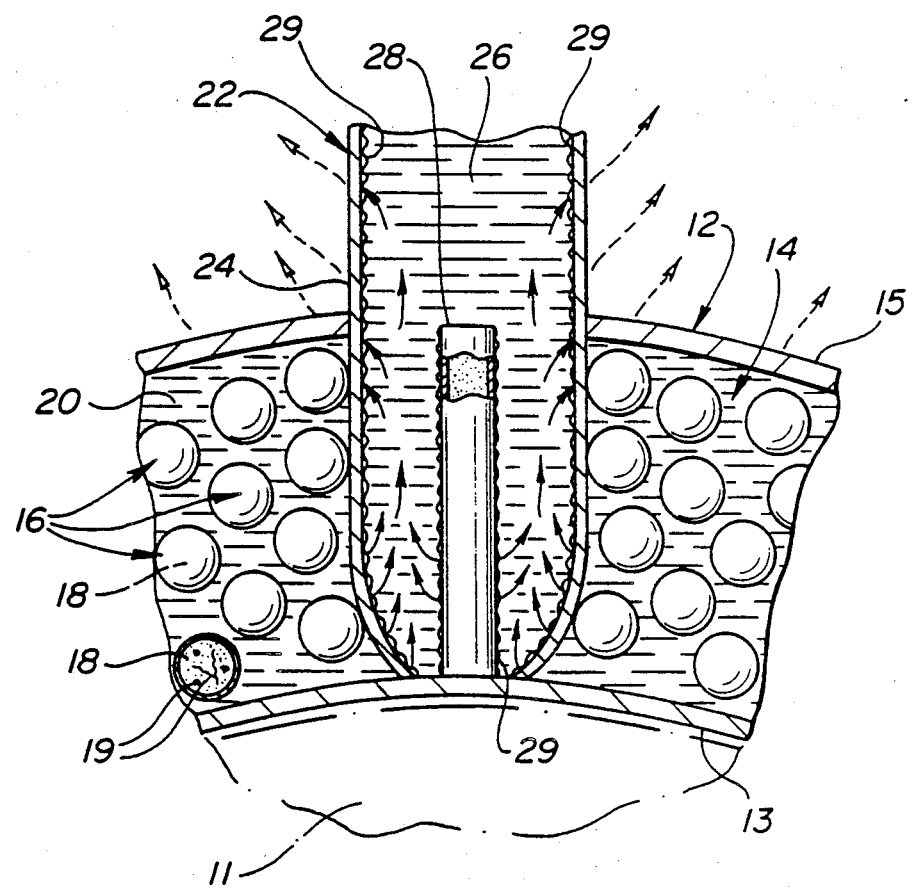
FIG. 4 is a cross-section of the preferred embodiment of a heat pipe.

In the preferred embodiment of FIGS. 1-4, container 12 is comprised of a metal material, preferably stainless steel for high temperature applications, and defines an annular space between inner wall 13 and outer wall 15 substantially surrounding heat source 11. As seen in FIGS. 2-4, shells 16 are preferably spherical i shape and are typically comprised of stainless steel or molybdenum. Phase change material 18 is encapsulated in shells 16. A lithium salt, such as lithium hydride, is preferred for high power applications. Voids and cracks 19 in phase change material 18 permit such phase change material to expand when heated without rupturing shells 16. The bath of thermally conductive material 20 is, for high power applications, preferably a sodium potassium bath capable of withstanding high temperatures.

Shown in FIG. 4, heat pipes 22, micro or semi-micro annular heat pipes as are known in the art, are comprised of a conductive tube 24 and working fluid 26. Inner core 28 is comprised of encapsulated phase-change material and typically extends, preferably in coaxial orientation, within the volume defined by tube 24. Such inner cores enhance the performance and thermal conductivity of heat pipe 22. Wick 29 is comprised of materials such as screens, grooves or fibers, which are typically disposed inside annular heat pipes on the inner surfaces of tube 24 and outer surfaces of inner core 28 to provide for return of condensed working fluid 26 by capillary action. Such heat pipes are discussed by A. Faghri et al, in "Heat Pipes for Hands," *Mechanical Engineering*, pages 70-74 June 1989, and A. Faghri, 1988, "Performance Characteristics of a Concentric Annular Heat Pipe—Parts I and II," *Proceedings of the 1988 National Heat Transfer Conference. Vol 1*, HTD-Vol. 96, page 386.

Heat pipes 22 have an extremely high thermal conductivity. Their presence in heat sink 14 permits thermal energy (represented by dashed arrows in FIG. 4) to be conducted away from heat source 11 at an extremely high rate. Thermal energy is conducted into heat sink 14 both through the surfaces of outer wall 15 and through heat pipes 22 by action of working fluid 26 (represented by solid arrows in FIG. 4), rather than only being conducted through the surfaces of outer wall 15. Because of the isothermal characteristics and high heat transfer capacity of heat pipes 22, the radial temperature drop across container 12 is significantly reduced, and surfaces of inner wall 13 near heat source 11 are maintained within acceptable temperature ranges by the present invention. For example, even when operating in the range of 800-1600° K., the isothermal characteristics of heat pipes 22 result in a maximum temperature drop between the opposite ends of heat pipes 22 to be generally on the order of 10° K. The capacity of heat pipes 22 to conduct and dissipate some heat directly to ultimate heat sink 34 during the burst period further alleviates the demand for the mass of the phase-change material for storage of a given heat load.

Heat pipes 22 may be micro or, preferably, semi-micro, annular heat pipes. Micro heat pipes generally have a diameter of 0.1–10 mm and a length of 10–1,000 mm. Semi-micro heat pipes may be defined as having a diameter of generally 10–100 mm and a length of 10–10,000 mm. The cross sections of heat pipes can be circular, square or other shapes, but the annular heat PiPe is preferred as described and discussed. The phase-change material encapsulated in inner core 28 of annular heat pipe 22 provides much larger contact area with working fluid 26 than ordinary circular heat pipes, provides additional surface area for wick material, and permits the heat transfer capacity of heat pipe 22 to be nearly doubled. These design features are discussed by Cotter, T. P., in "Principles and Prospects of Micro Heat Pipes," *Proc. 5th Int. Heat Pipe Conf.* pages 328–335, 1984; and Chen, M. M., Faghri, A., "An Analysis of the Vapor Flow and the Heat Conduction Through the Liquid-Wick and Pipe Wall in a Heat Pipe with Single or Multiple Heat Sources," *Proc. 1989 ASME National Heat Transfer Conference, Philadelphia, Pa.,* 1989.

The components of the present invention are joined by means known in the art, preferably press fitting, and if needed, welding and brazing.

A further aspect of the present invention relates to the dissipation of thermal energy from heat sink 14. Thermal energy management systems without heat pipes 22 require radiators to reject stored heat into an ultimate heat sink 34. Without heat pipes, spaced-based applications require much longer orbit time after the burst power mode in which to dissipate thermal energy. Because of the large ratio of radiation surface area to the mass of heat pipes, heat pipes 22 are also preferably used for radiators for applications in outer space. Radiators 30 of other designs may also be used in conjunction with heat pipes 22, directly (FIG. 3), or indirectly through a second container 32 (FIG. 2) enclosing heat pipes 22. However, these alternative configurations are not preferred.

While certain representative embodiments and details have been shown for purposes of illustrating the invention, in particular a high power space-based application, it will be apparent to those skilled in the art that various changes in the thermal energy management system disclosed herein may be made without departing from the scope of the invention, which is defined in the appended claims.

What is claimed is:

1. A thermal energy management system comprised of
   (1) a container having an inner wall and an outer wall, defining a volume therebetween;
   (2) a heat sink disposed therein; and
   (3) a plurality of heat pipes disposed in said heat sink extending in a generally outward direction.

2. A thermal energy management system as recited in claim 1 wherein said container defines a generally annular volume.

3. A thermal energy management system as recited in claim 1 wherein one or more of said plurality of heat pipes is in contact with said inner wall.

4. A thermal energy management system as recited in claim 1 wherein one or more of said plurality of heat pipes extend generally radially outward beyond said container.

5. A thermal energy management system as recited in claim 1 wherein one or more of said plurality of heat pipes are micro heat pipes.

6. A thermal energy management system as recited in claim 1 wherein one or more of said plurality of heat pipes are semi-micro heat pipes.

7. A thermal energy management system as recited in claim 1 wherein one or more of said plurality heat pipes are annular heat pipes.

8. A thermal energy management system as recited in claim 7 wherein said annular heat pipes further comprise an inner core of heat sink material.

9. A thermal energy management system as recited in claim 1 wherein said heat sink further comprises:
   a bath of thermally conductive material; and
   a plurality of shells containing heat sink material immersed in said bath of thermally conductive material.

10. A thermal energy management system as recited in claim 9 wherein said bath of thermally conductive material comprises a sodium potassium bath.

11. A thermal energy management system as recited in claim 9 wherein said heat sink material comprises a phase-change material.

12. A thermal energy management system as recited in claim 11 wherein said phase-change material comprises a lithium salt.

13. A thermal energy management system as recited in claim 9 wherein said shells are spherical.

14. A thermal energy management system as recited in claim 9 wherein said shells are cylindrical.

15. A thermal energy management system as recited in claim 9 wherein said shells are comprised of a metal material.

16. A thermal energy management system as recited in claim 1 wherein said container is comprised of metal material.

17. A thermal energy management system as recited in claim 1 wherein said container is adapted to substantially surround a heat source.

18. A thermal energy management system as recited in claim 1 further comprising means for transmitting thermal energy from said system to an ultimate heat sink.

19. A thermal energy management system as recited in claim 18 wherein said means for transmitting thermal energy comprises at least one radiator communicating with one or more of said heat pipes.

20. A thermal energy management system as recited in claim 19 wherein said radiator comprises a second container enclosing said heat pipes.

21. A thermal energy management system as recited in claim 18 wherein said means for transmitting thermal energy comprises at least one radiator in communication with said container.

22. A thermal energy management system comprised of
   (1) a container having an inner wall and an outer wall, said container adapted for exposure to a heat source;
   (2) a heat sink contained therein further comprising;
      (a) a bath of thermally conductive material;
      (b) a plurality of shells containing phase-change material; and
      (c) a plurality of heat pipes extending outward through said heat sink away from said heat source.

23. A thermal energy management system as recited in claim 22 wherein said volume defined by said container is a generally annular volume.

24. A thermal energy management system as recited in claim 22 wherein said plurality of heat pipes extend outward in generally radial orientation.

25. A thermal energy management system as recited in claim 22 wherein one or more of said plurality of heat pipes extend outward from said inner wall.

26. A thermal energy management system as recited in claim 22 wherein said one or more of said plurality of heat pipes are annular heat pipes further comprising inner cores of phase-change material.

27. A thermal energy management system as recited in claim 22 wherein one or more of said plurality of heat pipes are semi-micro heat pipes.

28. A thermal energy management system as recited in claim 22 wherein said heat pipes are adapted for radiating thermal energy to an ultimate heat sink.

29. A thermal energy management system as recited in claim 22 further comprising means for transmitting thermal radiation from said system to an ultimate heat sink.

30. A thermal energy management system comprised of
 (1) an annular container adapted for exposure to a heat source;
 (2) a heat sink contained in said annular container further comprised of
  (a) a bath of thermally conductive material
  (b) one or more shells containing phase-change material; and
  (c) one or more heat pipes extending generally radially outward through said annular container, whereby one end of said heat pipe extends beyond the outer wall of said annular container.

31. A thermal energy management system as recited in claim 30 further comprising means for transmitting thermal energy from said system to an ultimate heat sink.

* * * * *